July 15, 1969  M. L. GREENBERG  3,455,122
PRECISION SPLINE

Filed Aug. 19, 1966  2 Sheets-Sheet 1

INVENTOR.
MYRON L. GREENBERG
BY
Barnes, Kisselle, Raisch & Choate
ATTORNEYS

July 15, 1969     M. L. GREENBERG     3,455,122

PRECISION SPLINE

Filed Aug. 19, 1966     2 Sheets-Sheet 2

*INVENTOR.*
MYRON L. GREENBERG
BY
Barnes, Kisselle, Laisch & Choate
ATTORNEYS

United States Patent Office 3,455,122
Patented July 15, 1969

3,455,122
PRECISION SPLINE
Myron L. Greenberg, Union Lake, Mich., assignor, by mesne assignments, to The Babcock & Wilcox Company, New York, N.Y., a corporation of New Jersey
Filed Aug. 19, 1966, Ser. No. 573,513
Int. Cl. F16d 3/06, 3/80, 35/00
U.S. Cl. 64—23       10 Claims

ABSTRACT OF THE DISCLOSURE

A precision spline connection between a driving member. Pressure pads are provided on oppositely facing teeth which mesh with the set of teeth of the other member. Pressure pads are provided on oppositely facing sides and adjacent the apex of each of the teeth in one set, and fluid under pressure is applied to the pads to prevent metal contact between the meshing teeth.

---

This invention relates to precision splines.

In the transmission of forces between one member and another, it is conventional to utilize a spline connection, commonly known as a multiple spline, to transmit torque and at the same time permit axial movement of the member being rotated relative to the driving member. One of the major problems with spline connections is that the members stick or bind especially during axial or longitudinal movement. In addition it is necessary that the members be accurately aligned axially relative to one another. Further, any inaccuracies in the mating tooth surfaces tend to cause a backlash or an axial misalignment which may be undesirable in certain precision applications. All of the above problems combine over a period of time to produce wear. Finally, power surges due to load change or starting produce a hammering effect which also deteriorates the spline tooth surfaces.

Among the objects of the invention are to provide a precision spline connection which obviates the aforementioned difficulties in the prior art including the elimination of sticking or binding, wear, backlash and the necessity for accurate alignment of the axes, while at the same time providing a precision spline connection which completely eliminates any metal-to-metal contact between the members and maintains the members in stable, stiff and accurate relation without transmitting even impact forces to the teeth surfaces.

Basically the invention comprises providing pressure pockets or pads on the teeth of one of the members, a restrictor in association with each pressure pad and supplying fluid under pressure to each restrictor so that a pressurized film of fluid flows continuously between the complementary surfaces of the teeth of the two members. Any forces on the rotary members due to loads or due to transmission of the torque or other movement from one member to the other is balanced by the pressures in the pads while the torque is transmitted from one member to the other through the pressurized film, the members being retained in accurate and stable relation to one another during operation.

Figure 1:
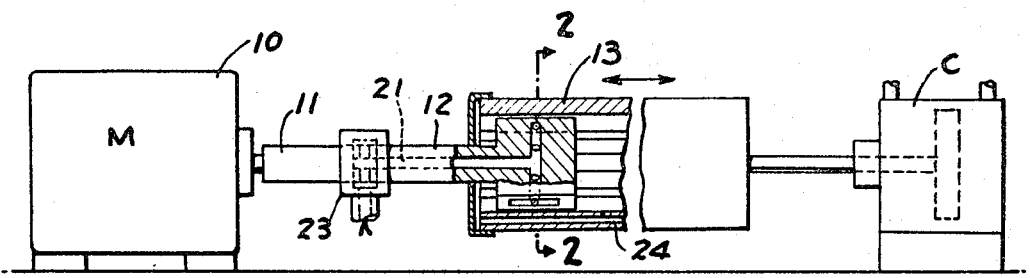
FIG. 1 is a partly diagrammatic part sectional elevational view of a machine embodying the invention.

Referring to FIG. 1, a spline connection embodying the invention may be used for example in connection with a motor 10 that has an output shaft 11 for driving the inner member 12 of the spline connection which, in turn, rotates the outer member 13, the latter being also movable axially relative to the inner member 12 as well as the motor 10 by suitable means such as a slide and cylinder or lead screw (not shown). As shown in FIG. 1, this comprises a cylinder C that has its piston rod connected to the outer member 13.

The inner and outer members 12, 13 are formed with complementary teeth of any well known cross section, as will be apparent hereinafter.

Figure 2:
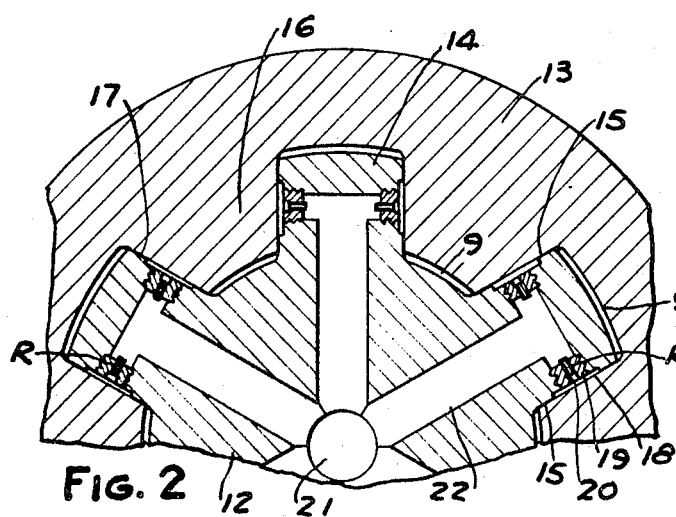
FIG. 2 is a fragmentary sectional view on an enlarged scale taken along the line 2—2 in FIG. 1.
Figure 3:
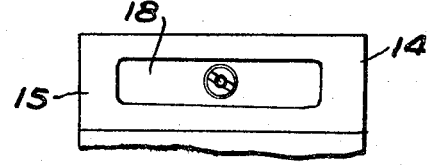
FIG. 3 is a fragmentary side elevational view of a tooth on one of the members shown in FIGS. 1 and 2.

Referring specifically to FIGS. 2 and 3, the lands or teeth 14 on the inner member 12 comprise parallel straight sides 15 which are parallel to radial planes extending through the member 13. The grooves or teeth 16 on the outer member 13 have complementary surfaces 17. A pressure pad is considered to include the pocket 18 and the surrounding close film area 15, as far as the drain manifold 9.

Some or preferably all of the teeth 14 on the inner member 12 are provided with a pressure pocket 18 on each surface 15. A restrictor R is associated with each pressure pocket 18 which (as shown in FIGS. 2 and 3) may comprise a set screw 19 threaded into the base of each pocket 18 and having an opening therein in which a restrictor such as a capillary or orifice 20 is positioned. Any other reasonable feed system may be employed, including one in which the capillaries are quite remote from the pockets 18, the pockets being fed by a channel which is large enough so that no significant pressure drop is produced by flow between restrictor and pocket. As shown in FIG. 1, one manifolding scheme employs an axial opening 21 extending through the inner member 12. Radial passages 22 provide communication between the restrictors R and the axial opening 21. Fluid under pressure is supplied to a rotary fitting 23 through axial opening 21, radial passages 22 to the restrictors R and, in turn, to each of the pockets 18. Any type of fluid such as hydraulic fluid or air may be used. A viscous liquid with reasonable lubricity such as machine oil is preferred but is not essential. Air or gas can be used only where light torque or loads are encountered, as will be readily apparent hereinafter. Fluid drains off at near atmospheric pressure from spaces 9.

The space between the surfaces 15, 17 is made such that a film of fluid flows preferably but not necessarily in laminar fashion throught the restrictors R into the pockets and between the surfaces in a thin film which maintains the surfaces in spaced apart relation with the members in accurate and stable relation to one another.

The space between the surfaces may vary but preferably is between five thousandths (0.005) of an inch and one ten-thousandths (0.0001) of an inch and preferably between two thousandths (0.002) of an inch and one ten-thousands (0.0001) of an inch. Although it is preferred that the space between the surfaces be the same throughout, any inaccuracies in flatness or conformity between male and female surfaces will be compensated for, provided at least some portions of the spaces are within the above limits.

When fluid is supplied between the surfaces, the members 12, 13 are maintained in stable accurate relation relative to one another. Any force which tends to move one member relative to the other is opposed by the pressure in the pressure pads. Thus, for example referring to FIG. 2, any force tending to move the member 12 to the right relative to member 13 causes the pressure in the pads which are to the right to increase while the pressure in the diametrically opposite pads decreases. This produces a restoring force that tends to return and thereby maintain the members in relative stable relation. It can be appreciated that since there are a plurality of circumferentially spaced teeth any force tending to rotate or translate one of the members relative to the other will be opposed by at least some of the pressure pads.

When torque is applied to one of the members to rotate the member, this torque is transmitted through the pressurized film of fluid to the other member without metal-to-metal contact between the members. The torque tends to increase the pressure in the pads in the direction of rotation and decrease the pressure in the pads opposite this direction and this increased pressure maintains the flow of fluid and thereby the spaced relation of the surfaces.

Axial movement of the members 12, 13 relative to one another does not affect the stable accurate relation of the members to one another, but no appreciable friction force opposes axial movement.

If the fluid utilized is a liquid, then the liquid can drain outwardly through appropriate openings 9 into a main drain manifold in one of the members as shown at 24 in FIG. 1.

Figure 4:
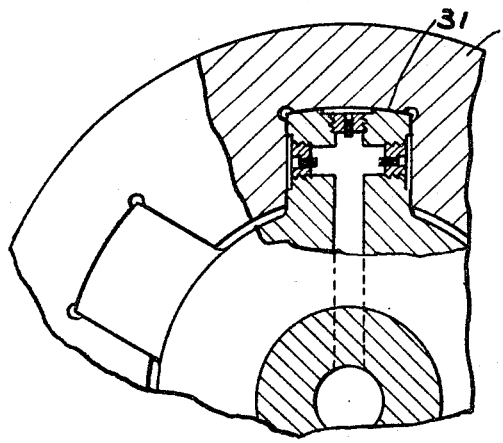
FIG. 4 is a fragmentary part sectional view similar to FIG. 2 of a modified form of the invention.
Figure 5:
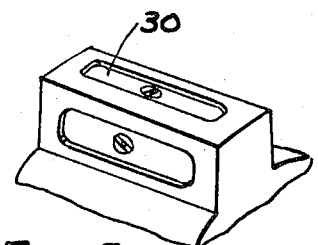
FIG. 5 is a fragmentary perspective view of a portion of one of the members shown in FIG. 4.

In the form of the invention shown in FIGS. 4 and 5, additional pressure pads 30 are provided on the ends of the teeth and cooperate with complementary surfaces 31 in the outer member 13$^1$, thus providing additional stiffness to oppose transverse rotation or translation.

Figure 6:
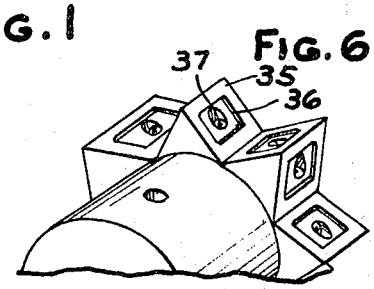
FIG. 6 is a fragmentary perspective view of a further modified form of member utilized in a modified form of the spline connection.

In the form of the invention shown in FIG. 6, the teeth 35 on the inner member have a triangular cross section and the pockets 36 and associated restrictors 37 are provided in the sides of the teeth 35.

Figure 7:
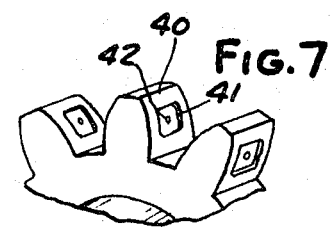
FIG. 7 is a fragmentary perspective view of a member utilized in a further modified form of the spline connection.

In the form of the invention shown in FIG. 7, the teeth 40 have an involute cross section and the pressure pockets 41 are provided in the surfaces of the teeth with the restrictors 42 in the base of the pressure pads as in the previous form of the invention.

In each of the forms of the invention shown in FIGS. 6 and 7, the outer member has teeth with complementary surfaces.

Figure 8:
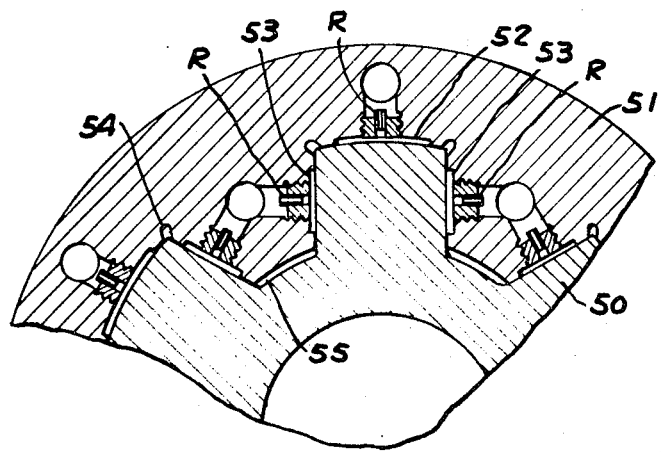
FIG. 8 is a fragmentary part sectional view of a further modified form of the invention.

In the form of the invention shown in FIG. 8, the teeth and complementary surfaces of the inner member 50 and the outer member 51 respectively are similar in shape to those shown in FIG. 4. However, the pressure pockets of pads 52, 53 and associated restrictors R are provided on the surfaces of the outer member 51 rather than the inner member 50. The flow of fluid is to the periphery of the pads and then to axial drain grooves 54, 55 as in the other forms of the invention.

Figure 9:
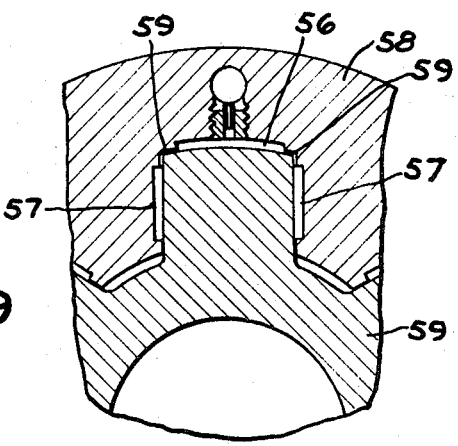
FIG. 9 is a fragmentary part sectional view of a further modified form of the invention.

In the form of the invention shown in FIG. 9, the pads 56, 57 are provided in the complementary surfaces of the outer member 58 rather than the inner member 59. Instead of having individual orifices for the pressure pads 57, fluid flows from the pressure pads 56 through grooves 59 which are of capillary size to the pressure pads 57. Thus the fluid supplied to the pressure pads 57 is substantially equal in pressure to opposing pads but of lesser pressure than fluid supplied to the pads 56.

Figure 10:
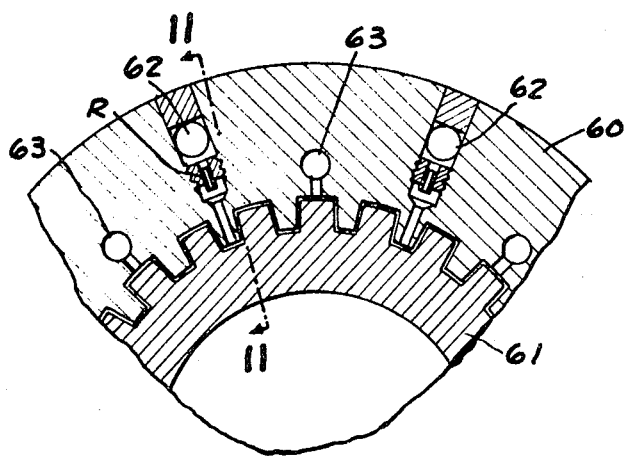
FIG. 10 is a fragmentary plan view of a further modified form of the invention.
Figure 11:
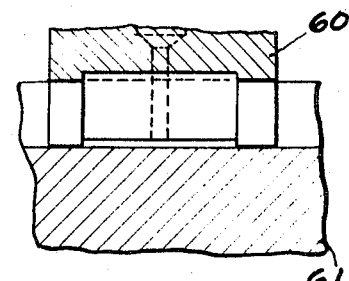
FIG. 11 is a fragmentary sectional view taken along line 11—11 in FIG. 10.

In the form of the invention shown in FIGS. 10 and 11, the outer and inner members 60, 61 have complementary surfaces and teeth which are dimensionally interrelated such that substantially the entire space between the teeth forms a pressure pad. At circumferentially spaced points fluid under pressure is supplied through inlets 62 and restrictor R to the space between the teeth. The fluid flows circumferentially to drain openings 63 where the pressure is substantially dissipated. The fluid flows also axially of the spline to the periphery of the teeth where the pressure is substantially dissipated. It is also possible to provide a relieved pocket, if it should prove desirable.

It can thus be seen that there has been provided a spline connection wherein both rotary and axial movement may be achieved without wear, binding or sticking while the parts are maintained out of metal-to-metal contact and in stably spaced and accurate relation to one another.

I claim:
1. A precision spline connection comprising
   a first member having a plurality of circumferentially spaced teeth,
   a second member having a plurality of complementary circumferentially spaced teeth thereon meshing with said first mentioned teeth,
   at least one set of circumferentially spaced pressure pads on one of said sets of teeth,
   a restrictor associated with each said pressure pad,
   means for rotating one of said members,
   means for moving one of said member axially relative to the other said member,
   means for supplying fluid under pressure to said pressure pads,
   at least two generally oppositely facing pressure pads are provided on each of said teeth of said one set of teeth,
   a third pressure pad adjacent the apex of said teeth.
2. The combination set forth in claim 1 wherein said pressure pads are provided on said inner member.
3. The combination set forth in claim 1 wherein said pressure pads are provided on said outer member.
4. The combination set forth in claim 1 wherein said teeth on one said member have an involute cross section.
5. The combination set forth in claim 1 wherein said teeth on said one member have straight sides generally parallel to radial planes.
6. The combination set forth in claim 1 wherein said teeth on said one member having a generally triangular cross section.
7. The combination set forth in claim 1 wherein said fluid comprises a liquid,
   one of said member having drain passages therein for permitting egress of the liquid.
8. The combination set forth in claim 1 wherein the restrictors are mounted in the base of each of said pressure pads.
9. A precision spline connection comprising
   a first member having a plurality of circumferentially spaced teeth,
   a second member having a plurality of complementary circumferentially spaced teeth thereon meshing with said first mentioned teeth,
   said teeth comprising straight side surfaces generally parallel to radial planes and end surfaces,
   at least some of said teeth having pressure pads on the side surfaces thereof and on the apexes thereof,
   a restrictor associated with the pressure pad on the apex of said teeth,
   and capillary size grooves extending from the pressure pads of said apexes to the adjacent pressure pads on the side surfaces of said tooth,
   means for rotating one of said members,
   means for moving one of said members axially relative to the other of said member,
   means for supplying fluid under pressure to said pressure pad,
   the relative dimensions of said complementary surfaces being such that a space is provided between the surfaces through which a pressurized film of fluid flows continuously so that forces on said members are balanced by pressures in the pads there by providing a permanent separation of the surfaces through which torque can be transmitted while retaining the members in accurate stable frictionless relation to the one another.

10. A precision spline connection comprising
a first member having a plurality of circumferentially spaced teeth,
a second member having a plurality of complementary circumferentially spaced teeth thereon meshing with said first mentioned teeth,
a plurality of circumferentially spaced fluid inlets in one of said members, less than the number of teeth on said one member, for supplying fluid to circumferentially spaced points between the surfaces of the said complementary teeth,
a plurality of circumferentially spaced drainage openings between said inlets for receiving fluid from the spaces between said teeth,
an orificed associated with each said inlet,
and the relative dimensions of said complementary surfaces being such that a space is provided between the surfaces though which a pressurized film of fluid flows continuously so that forces on said members are balanced by pressures in said space thereby providing a permanent separation of the surfaces through which torque can be transmitted while retaining the members in accurate stable frictionless relation to one another,
means for rotating one of the members,
means for moving one of the members axially relative to the other of said members,
and means for supplying fluid under pressure through said inlets.

References Cited

UNITED STATES PATENTS

| | | | |
|---|---|---|---|
| 2,305,439 | 12/1942 | Miller | 64—26 |
| 2,730,877 | 1/1956 | Suberkrub | 64—26 |
| 2,812,648 | 11/1957 | Croset | 64—26 |
| 3,231,319 | 1/1966 | Porath | 308—5 |
| 3,365,913 | 1/1968 | Shields | 64—9 |

HALL C. COE, Primary Examiner

U.S. Cl. X.R.

64—26